COLOR TV BRIGHTNESS CONTROL
Filed Feb. 7, 1966
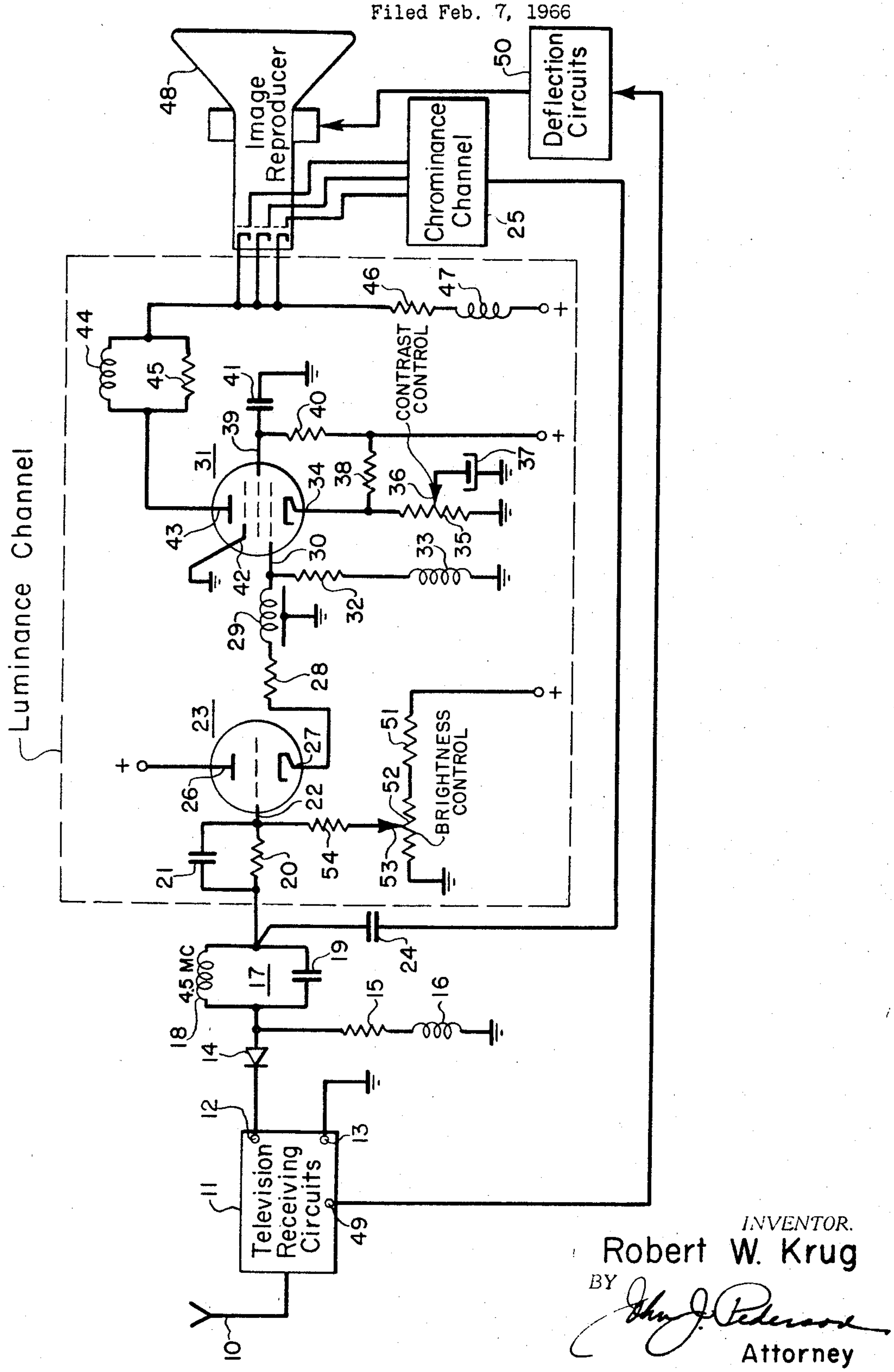
INVENTOR.
Robert W. Krug
BY [signature]
Attorney

United States Patent Office 3,412,202
Patented Nov. 19, 1968

3,412,202

COLOR TV BRIGHTNESS CONTROL

Robert W. Krug, Oak Park, Ill., assignor to Zenith Radio Corporation, Chicago, Ill., a corporation of Delaware Filed Feb. 7, 1966, Ser. No. 525,607
6 Claims. (Cl. 178—5.4)

ABSTRACT OF THE DISCLOSURE

A color television brightness control system which maintains a substantially constant D.C. transmission factor in the luminance channel regardless of the setting of the brightness control through a unique combination of voltage divider networks of unlike impedances. Specifically, the luminance signal is fed to the luminance amplifier by means of a high impedance voltage divider which returns to ground through the movable tap of a lower impedance brightness control potentiometer. This enables an optimum ratio of D.C. to A.C. coupling to be selected, i.e. approximately 50% for home-entertainment use which avoids the disadvantages of low D.C. transmission, namely improper color rendition and a washed-out appearance during reproduction of low-brightness scenes, as well as the disadvantages of excessive D.C. transmission, such as blooming and excessive sudden brightness variations often annoying to viewers in a darkened room.

The present invention relates to improvements in television receivers and more particularly, to an improved brightness control system for use in the luminance channel of a color television receiver.

In accordance with present United States standards governing color and monochrome television transmissions, the transmitted carrier-wave is amplitude-modulated by a luminance signal which conveys brightness information in the scene being televised. This signal has an alternating-current (A.C.) component representing elemental brightness variations and a direct-current (D.C.) component representing the scene's average brightness level. For accurate reproduction of the televised scene by a television receiver, it is necessary that both of these luminance components be applied to the receiver's image reproducer. This is especially true in the case of a color television receiver, where the direct-current luminance component is necessary for proper color rendition. Color television receivers commonly employ a D.C. coupled luminance channel which concurrently amplifies both the A.C. and the D.C. components of the detected luminance signal. The amplified components, together with a chrominance signal from the receiver's chrominance channel, are then simultaneously applied to the receiver's color image reproducer to produce an image having the brightness, hue, and color saturation characteristics of the televised image.

The luminance channel of a color television receiver provides a convenient and economical means for applying a viewer-adjustable brightness control potential to the color image reproducer, which in the present art is a three gun shadow-mask cathode-ray tube. By including the brightness control system in the luminance channel a considerable savings in cost is realized, since the only practical alternative is to apply separate brightness control potentials to each of the three cathode-ray tube guns, which necessitates the use of independent control circuitry for each gun. However, prior art systems for controlling brightness through the luminance channel have had the serious drawback of causing the percentage of direct-current coupling, i.e. the portion of the D.C. luminance signal component applied to the cathode-ray tube, to vary with adjustment of the brightness control.

For faithful reproduction of a televised scene it is highly desirable that the percentage of D.C. coupling remain relatively constant at a predetermined level, regardless of the brightness control seting. Insufficient D.C. coupling is evidenced by the reproduced image failing to conform to average brightness changes in the televised scene, and in the case of color transmissions, improper color rendition. Excessive D.C. coupling, on the other hand, can result in overloading of the cathode-ray tube anode power supply under high-brightness viewing conditions. This causes objectionable blooming and focus degradation in the reproduced image. Furthermore, excessive D.C. coupling is often annoying to a viewer in a darkened room because of the severe brightness variations which sometimes occur, as when a station switches from a black fade to a high brightness scene. In practice, it has been found that a ratio of approximately 50% between the applied D.C. and A.C. components provides a good degree of average brightness control without causing excessive beam current and ensuing loss of high voltage regulation at high brightness operating levels. It follows then that it would be highly desirable for any brightness control system utilized in the luminance channel of a color television receiver to maintain this ratio regardless of brightness control adjustments.

It is an object of the invention, therefore, to provide a new and improved brightness control system for use in a color television receiver.

It is a more specific object of the invention to provide a brightness control system for use in the luminance channel of a color television receiver wherein adjustment of the brightness control has a minimal effect on the D.C. luminance component applied to the receiver image reproducer.

It is another object of the invention to provide a new and improved brightness control system which can be incorporated in the luminance channel of a color television receiver at minimum expense.

Accordingly, the invention is directed to a brightness control system for use in a color television receiver or the like including an image reproducer, a uni-directional current source, and a source of composite luminance signals having alternating-current and direct-current components. The system comprises means, including a luminance amplifier having an input terminal and an output terminal coupled to the image reproducer, for amplifying and applying the luminance signal components to the image reproducer. The system further comprises means connected between the luminance signal source and the input terminal for applying to the luminance amplifier only the alternating-current luminance signal components. Means, comprising a first voltage divider network having one of its end terminals connected to the uni-directional source and its other end terminal connected to the plane of reference potential and having a variable tap, are included for producing a viewer-adjustable brightness control potential. Means, including a second voltage divider network having first and second impedance elements, are included for concurrently applying predetermined portions of the direct-current luminance signal component and the brightness control potential to the input terminal, the first impedance element being coupled between the luminance signal source and the input terminal and the second element being coupled between the input terminal and the variable tap on the first voltage divider and the impedance of the second network being substantially greater than the impedance of the first network to render the predetermined portion of the direct-current luminance signal component applied to the input terminal substantially independent of the position of the variable tap on the first voltage divider network.

The features of the present invention which are believed to be novel are set forth with particularity in the appended claims. The invention, together with further objects and advantages thereof, may best be understood by reference to the following description taken in connection with the accompanying drawing, in which the single figure is a detailed schematic diagram of a color television receiver having a luminance channel which includes a brightness control system constructed in accordance with a preferred embodiment of the invention.

The television receiver shown in the figure comprises an antenna 10 coupled to television receiving circuits 11, which include conventional translating and amplifying stages for producing an intermediate-frequency signal at terminals 12 and 13. Terminal 12 is connected to the cathode electrode of a diode detector 14 and terminal 13 is grounded. The anode electrode of diode 14 is connected to ground by a detector load circuit serially comprising a resistor 15 and a shunt-peaking coil 16. The anode electrode of diode 14 is further connected to one terminal of a 4.5 megacycle intercarrier trap 17, which comprises the parallel combination of a variable inductance 18 and a capacitor 19. The other terminal of trap 17 is connected by the parallel combination of a resistor 20 and a capacitor 21 to the control electrode 22 of an electron-discharge device 23, and is further connected by a capacitor 24 to the chrominance channel 25. Electron-discharge device 23 has an anode electrode 26 connected to a positive unidirectional source, and a cathode electrode 27 connected by a circuit serially including a resistor 28 and a delay line 29 to the control electrode 30 of an electron-discharge device 31. Control electrode 30 is connected to ground through a resistor 32 and a shunt-peaking coil 33. The cathode electrode 34 of electron-discharge device 31 is connected to ground through a contrast-control potentiometer 35 and to a positive unidirectional source by a resistor 38. An arm 36 on potentiometer 35 is connected through an electrolytic capacitor 37 to ground. The screen electrode 39 of electron-discharge device 31 is connected by a screen dropping resistor 40 to a positive unidirectional source and is by-passed to ground by a capacitor 41. The suppressor electrode 42 is grounded and the anode electrode 43 is connected to a positive unidirectional source by a circuit which serially includes a peaking network comprising the parallel combination of a peaking coil 44 and a resistor 45, a resistor 46, and a plate shunt-peaking coil 47. The juncture formed by the peaking network and resistor 46 is connected to the three cathodes of image reproducer 48. Chrominance output signals from chrominance channel 25 are applied to the three grid electrodes of color image reproducer 48, which in this case is a standard three gun shadow-mask cathode-ray tube. The television receiving circuits 11 include a synchronizing signal output terminal 49 which is connected to conventional receiver deflection circuits 50, which, in turn, are connected to the deflection system of image reproducer 48.

As thus far described the receiver is entirely conventional, and accordingly only a brief description of its operation need be given here. A transmitted television signal is intercepted by antenna 10 and applied to television receiving circuits 11, wherein it is translated and amplified to appear as an intermediate-frequency signal at terminals 12 and 13. Diode detector 14 derives video-frequency information from this intermediate frequency signal, and the signal thus derived appears across resistor 15 and detector shunt-peaking coil 16. Resistor 15 serves as the diode load resistor, and peaking coil 16 acts in conjunction with distributed capacitance to improve the frequency response of the detected video signal. The detected signal is also applied to the 4.5 megacycle trap 17, which serves to isolate the intercarrier signal developed by the detector from the luminance channel. Capacitor 24 couples the signal from trap 17 to chrominance channel 25 wherein color information is derived for subsequent application to the image reproducer. Another capacitor 21 couples this same signal to control electrode 22 of electron-discharge device 23, and resistor 20 serves as a D.C. return to ground for this electrode. Electron-discharge device 23 is operated as a cathode-follower so that the luminance signal impressed on control electrode 22 appears in-phase at approximately unity gain on cathode electrode 27. This in-phase signal is coupled by resistor 28 and delay-line 29 to the luminance amplifier control electrode 30. Delay-line 29 delays the luminance signal so that it will be in proper time relation with respect to the chrominance information applied to image reproducer 48. To reduce reflections in the delay-line, resistors 28 and 32 are selected to match the delay-line characteristic impedance, which is approximately 1500 ohms. These resistors further serve as a voltage divider to the D.C. luminance component appearing on cathode electrode 27, and in practice reduce the D.C. coupling to control electrode 30 by approximately 50%. Peaking coil 33 acts in conjunction with the distributed capacity at this point to compensate for video-frequency circuit losses.

Contrast-control potentiometer 35 is connected as a cathode impedance and develops grid-cathode operating bias for electron-discharge device 31. The movable arm on this potentiometer is by-passed to ground by capacitor 37, so that by moving this arm the amount of degeneration introduced by the cathode impedance can be varied. This has the effect of varying the A.C. amplification of electron-discharge device 31, and hence the amplitude of the A.C. luminance component applied to image reproducer 48. Resistor 38 and potentiometer 35 form a voltage divider network from the positive uni-directional source to ground. This network maintains cathode electrode 34 at a predetermined positive potential when cathode current is not being drawn, as during black transmissions. Resistor 40 serves as a screen-dropping resistor to screen electrode 39, and capacitor 41 by-passes this electrode to ground.

Anode electrode 43 is energized by a positive uni-directional source through inductance 47, resistor 46, and the parallel combination of inductance 44 and resistor 45. Inductance 44 and resistor 45 serve as a conventional plate series-peaking network to compensate for video-frequency circuit losses. Shunt-peaking coil 47 is included for the same purpose. Resistor 46 serves as a plate-load impedance for electron-discharge device 31, and the amplified A.C. and D.C. luminance components appearing thereacross are simultaneously applied to the three cathodes of image reproducer 48. In practice it is usually necessary to apply different amounts of luminance signal to each of the three guns, but here the circuitry ordinarily included for this purpose has been omitted for the sake of simplicity. The luminance signals thus applied are matrixed in image reproducer 48 with chrominance signals produced in chrominance channel 25 to produce an image having brightness, hue, and color saturation characteristics corresponding to the televised image.

In accordance with the invention, the luminance channel shown in the figure includes a novel brightness control system which allows the viewer to vary the brightness of the image produced by image reproducer 48 without affecting either the A.C. or D.C. components of the luminance signal applied thereto. The system includes a first voltage divider serially comprising a resistor 51 and a brightness control potentiometer 52 interconnected between a positive unidirectional source and ground. An arm 53 on potentiometer 52 is connected by a resistor 54 to control electrode 22, and by moving arm 53 the potential on arm 53 can be continuously varied over a predetermined range. Resistors 20 and 54 form a second voltage divider interconnecting trap 17, which in this case can be considered a luminance signal source, and arm 53 of potentiometer 52. In accordance with the invention, resistors 20 and 54 are each of a resistance at least an order of magnitude larger than the resistance of potentiometer 52, so that the position of arm 53 has only a very minimal effect on the second voltage divider.

It will be recalled that the detected luminance signal includes two components; an A.C. component representing elemental brightness variations and a D.C. component representing the average brightness level of the televised scene. The A.C. component is coupled directly to control electrode 22 by capacitor 21 and the D.C. component is effectively impressed across the second voltage divider network, i.e. resistors 20 and 54. It can be seen that the portion of the D.C. component applied to control electrode 22 depends on the relative values of the two high-resistance resistors 20 and 54, and not on the setting of the relatively low-resistance potentiometer 52. Resistors 20 and 54 also serve as a voltage divider to the brightness control potential appearing on arm 53, however, in reverse proportion to their effect on the D.C. luminance component. In practice, resistors 20 and 54 have values of approximately one megohm and twelve megohms, respectively, so that substantially all of the D.C. luminance component and approximately 10% of the brightness control potential are concurrently impressed on control electrode 22. This choice of values for resistors 20 and 54 may be varied to achieve different amounts of coupling for the D.C. luminance component. Potentiometer 52 has a much lower value of resistance, in the order of 250,000 ohms, so that its setting has only a very minor effect on the portion of the D.C. luminance component impressed on control electrode 22.

The resulting D.C. signal, which represents the algebraic sum of the two concurrently impressed signals, is coupled by the cathode follower stage 23 to luminance amplifier stage 31. The signal, after amplification by electron-discharge device 31, is applied to image reproducer 48 to control the brightness of the reproduced image.

In accordance with the invention, the brightness control system heretofore described allows the viewer to adjust the brightness level of the reproduced image without changing the degree of D.C. coupling between the image reproducer and the detected luminance signal. Direct-current coupling is maintained at a constant predetermined level, so that optimum image reproduction can be achieved under a wide variety of viewing conditions. The single value of D.C. coupling to be maintained is selected to provide good color rendition without the undesirable blooming affects which often result from excessive D.C. coupling. An additional advantage of this novel brightness control system is that it is well suited for use in present day mass-produced low profit-margin television receivers. It requires a minimum of extra components, and those required are relatively inexpensive passive resistance element.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A brightness control circuit for use in a color television receiver or the like including an image reproducer, a unidirectional current source, a plane of reference potential and a source of composite luminance signals having alternating-current and direct-current components, said circuit comprising:

means, including a luminance amplifier having an input terminal and an output terminal coupled to said image reproducer, for amplifying and applying said luminance signal components to said image reproducer;

means connected between said luminance signal source and said input terminal for applying to said luminance amplifier only said alternating-current luminance signal components;

means, comprising a first voltage divider network having one of its end terminals connected to said unidirectional source and its other end terminal connected to said plane of reference potential and having a variable tap, for producing a viewer-adjustable brightness control potential;

and means, including a second voltage divider network having first and second impedance elements, for concurrently applying predetermined portions of said direct-current luminance signal components and said brightness control potential to said input terminal, said first impedance element being coupled between said luminance signal source and said input terminal and said second element being coupled between said input terminal and said variable tap on said first voltage divider and the impedance of said second network being substantially greater than the impedance of said first network to render said predetermined portion of said direct-current luminance signal component applied to said input terminal substantially independent of the position of said variable tap on said first voltage divider network.

2. A brightness control circuit as described in claim 1 wherein said second voltage divider network is of at least an order of magnitude larger than the impedance of said first network.

3. A brightness control circuit as described in claim 2 wherein said first voltage divider network is a potentiometer and said variable tap is an arm manually and continuously adjustable over a predetermined range.

4. A brightness control circuit as described in claim 3 wherein said luminance signal source comprises a luminance detector and said means for applying only said alternating-current luminance signal components to said input terminal comprises a capacitor.

5. A brightness control circuit as described in claim 4 wherein said luminance amplifier comprises a vacuum tube and said input terminal is a control grid.

6. A brightness control circuit as described in claim 5 wherein said composite signal is of negative polarity and said uni-directional current source is of positive polarity.

References Cited

UNITED STATES PATENTS

| | | | |
|---|---|---|---|
| 2,872,617 | 2/1959 | Stark et al. | 178—5.4 XR |
| 3,328,519 | 6/1967 | Willis | 178—5.4 |

ROBERT L. GRIFFIN, *Primary Examiner.*

RICHARD MURRAY, *Assistant Examiner.*